United States Patent Office 2,946,657
Patented July 26, 1960

2,946,657

SEPARATING ILLITE FOR GEOCHEMICAL ANALYSES

Robert C. Reynolds, Jr., Tulsa, Okla., assignor to Pan American Petroleum Corporation, Tulsa, Okla., a corporation of Delaware No Drawing. Filed Mar. 5, 1958, Ser. No. 719,198

2 Claims. (Cl. 23—110)

This invention relates to geochemistry and is directed particularly to the preparation of samples for analysis in methods of geochemical prospecting for minerals and the like. More specifically, the invention is directed to, and has as its principal object, the separation of clay-mineral illite from earth or rock samples in which it occurs in mixtures with other minerals.

The term "clay minerals" is one that has acquired a definite meaning only within the last few years. Generally speaking, clay minerals are layer-lattice silicate minerals of very small particle size, being typically of less than 2 microns effective diameter. Clay-mineral particles occur in abundance in clays and shales and are chiefly responsible for the characteristic properties of these materials. Thus, the property of a clay of becoming plastic when slightly wetted is primarily due to the presence of specific clay minerals. Any given sample of natural clay, however, may contain substantial amounts of other well-known non-clay minerals.

Clay minerals are generally classifiable into one of two groups, either amorphous or crystalline, with the latter being by far the most abundant and important. Of the crystalline clay minerals there are several types classified on the basis of their crystal structure and chemical composition. Of a number of different types, the four which are believed to be the most abundant and widely occurring are chlorite, illite, montmorillonite, and kaolinite. These resemble each other structurally in having the various ions arranged in sheets made up of multiple layers of ions, but differ in the number of layers per sheet and in chemical composition.

Thus kaolinite, which commonly occurs in fresh water sediments, has its component ions arranged in two-layered sheets. Illite, which is abundant in many ancient marine shales, and montmorillonite are similar in structure in that their ion sheets are three-layered. They differ in other respects such as chemical composition, however, illite containing potassium ions at definite places in its crystal lattice whereas montmorillonite may not. Chlorite, with four-layered ion sheets, is often formed under chemically reducing conditions and is thus frequently an important constituent of black shales. There are several other known clay-mineral types, but they are of minor importance for geochemical measurements as they are less abundant and less widely occurring than these four.

Any of these and other clay minerals may occur in relatively pure form, but it is much more common to find them in various mixtures. Montmorillonite, illite, and chlorite may not only be physically mixed, but, due perhaps to certain of their chemical and crystalline similarities, it is common to find them interlayered with each other within the clay crystal structure. Due to its somewhat different structure, however, kaolinite does not ordinarily interlayer with any of the other three common clay minerals in forming clay-mineral mixtures. If present, it is usually randomly distributed among the other clay minerals.

As is to be expected from the extremely wide variety of conditions under which sedimentation and the forming of sedimentary rocks occur, not only do other minerals intermix with these clay minerals when clays and shales are formed, but these clay minerals may also be present in varying amounts in other types of sedimentary rocks such as limestones and sandstones. It has been observed, for example, that in limestone particularly, illite often may be present in almost pure form.

It has now been found that the clay mineral illite is an important carrier of chemical elements which are useful in trace-element analyses of earth samples. In other words, illite carries within its crystal structure, in addition to the ions of which it is chiefly composed, trace amounts of other elements. Furthermore, the relative amounts of these other elements, or of their various isotopes, have been observed to vary in significant ways. For example, the concentration of the element boron, even though it remains a very small proportion of the total constituents of illite, appears to vary directly with the salinity of the water in which the deposition of the mineral occurs.

For most purposes it is essential that the trace-element analyses be performed on relatively pure illite rather than on the bulk samples in the form they are recovered. This is because the other minerals not only dilute the illite of the bulk sample and in this way reduce the accuracy of the analysis, but they may also contribute to the concentration of the trace elements being measured. For example, a few grains of the boron-containing mineral tourmaline in a bulk sample may completely mask the boron content of the illite which is the significant variable for showing depositional water salinity.

In a similar way, grains of detrital mica from the weathering of granite may be mistaken for illite in a bulk sample, for the reason that illite and mica are substantially identical in crystal structure and in chemical composition. They usually differ widely, however, in their grain size and in their content of trace elements. Accordingly, for consistent results in trace-element analyses, particularly when the results are related to the quantity of illite present, it is necessary to make the measurements on illite that is in as nearly pure form as can be obtained.

Prior attempts to obtain illite in purified form from earth samples in which it occurs along with other minerals, both clay and non-clay in type, have given crude results. Particular difficulty arises in the common instances in which the illite is interlayered with other clay minerals in the clay crystals. Particle-size separations are of little or no assistance in this regard, as it is often found that the smallest particles that can be distinguished and utilized are still composed of interlayered sheets of the different clay minerals.

It is, accordingly, an important object of the present invention to obtain clay-mineral illite in a relatively purified form, not only when it is mixed with non-clay minerals, but also when it is interlayered with other clay minerals in the clay crystals. A further important object of the invention is to provide a method of treatment for breaking down the interlayered crystals in such a way that the illite therein can be recovered.

In accordance with the present invention, illite-containing samples which are to be analyzed for the trace elements carried by the illite are subjected to an ordered series of treatment steps which results in the concentration of the illite to a high degree and the substantial elimination of both non-clay and other clay minerals. An essential preliminary step of this treatment is to disaggregate the bulk sample into its constituent mineral grains without substantially altering the natural grain sizes or the grain-size distributions. This means that mechanical crushing of the samples by grinding and the like is to be avoided. The disaggregation is preferably carried out by subjecting the sample to high-frequency sonic radiation while submerged in a liquid such as water. After separation on the basis of particle size, the recovered clay-mineral fraction is subjected to chemical treatments successively with a strong alkali and an acid. These selectively attack and break down the crystal structures of the clay minerals other than illite, leaving it as a relatively insoluble residue.

Thus, the sample, in a suitable container such as a beaker partially filled with water, is placed in a liquid bath through which sound waves of high energy and frequency are transmitted. After a sufficient length of time of exposure to these waves, the disaggregation of the sample becomes effectively complete. The length of time required for this disaggregation varies according to the nature of the sample and the strength and frequency of the sonic or ultrasonic waves. In one apparatus that has been employed, operating at about 16,000 cycles per second, shale samples typically are disaggregated after about two or three hours of exposure to the sonic radiation. The clay-size particles of the sample, of 2 microns or less effective diameter, mostly remain suspended in the water in the beaker along with many larger particles, while the very largest particles settle out. A preliminary separation on the basis of particle size of the minerals is, therefore, easily effected by decanting the top portion of the liquid containing the suspended clay-mineral particles, leaving behind at the bottom of the container the non-clay minerals which constitute most of the settled largest particles.

A more precise separation of the less than 2 micron clay-mineral fraction from the somewhat larger particles drawn off with it in the preliminary separation is made by dispersing the particles in a larger volume of water and settling out the larger particles. For example, after dispersing the particles in one liter of distilled water in a tall, two-liter graduate, settling is allowed to take place for 16 to 18 hours. At the end of this time particles larger than 2 microns have settled out at the bottom of the column, and the water, containing essentially only particles of 2 microns or less effective diameter, is drawn off. By "effective" diameter is meant the diameter of a spherical particle having the same settling characteristics as the actual particle. Thus, a particle of irregular shape but settling in water at the same rate as a spherical particle 2 microns in diameter is said to have an effective diameter of 2 microns.

These particle-size separations eliminate a major portion of the sources of error in subsequent trace-element analyses. Thus, quartz, feldspar, mica, tourmaline, and other mineral grains of large size are left behind. The fine-particle-size fraction of 2 microns and smaller effective diameter suspended in the water is chiefly composed of the clay minerals and sometimes very fine silica. This fine-particle fraction is then flocculated and settled out of the water taken from the top of the sedimentation column by a suitable treatment, such as by slightly acidifying the water. The settling of the flocculated fine particles may advantageously be speeded up by centrifuging.

Next, the clay-mineral solids so recovered are subjected to a chemical treatment adapted to remove substantially all of the clay minerals except illite. The first step of this chemical treatment preferably comprises treating the solids with alkali, preferably hot, as by boiling them in a concentrated, say 6 N, solution of sodium hydroxide for an appropriate period of time. This treatment slowly dissolves the crystals of kaolinite, chlorite, montmorillonite, mixed-layered illite-montmorillonite, and other clay minerals present in minor amounts in the fine-particle-size fraction. By X-ray analysis of different clay-mineral mixtures treated with hot alkali for different lengths of time, it has been found that the crystal structures of the clay minerals other than illite are substantially completely broken down after about four hours. Illite, however, appears to be the most resistant of the clay minerals to this treatment, and it thus constitutes most of the insoluble crystalline residue left at the completion of the hot-alkali treatment.

The insoluble illite residue is then dispersed in distilled water and washed to remove as many as possible of the products of the hot-alkali attack. As a number of the reaction products are relatively insoluble hydroxides, however, further treatment is required to convert these materials to soluble salts. Accordingly, after settling out and recovery from the wash water, the insoluble residue is subjected to further treatment by reaction with an acid, such as by boiling in hot, dilute (for example, 1 N) hydrochloric acid for a period of time, typically about one hour. This acid treatment, following the prior treatment with alkali, converts the insoluble reaction products of the alkali treatment to soluble salts and thus substantially completes the destruction of montmorillonite and mixed-layered illite-montmorillonite. The final residue which remains after the treatment with hot acid and a final washing in distilled water to remove the soluble salts is sometimes almost 100 percent illite.

Some of the illite in the bulk sample is destroyed in the combined alkali-acid treatment. This is especially noticeable when there is a high degree of mixed layering of the illite with other clay minerals. Even in such cases, however, the final insoluble residue obtained from the complete series of treatment steps is greatly enriched in illite containing little mixed layering with the other clay minerals. Such diluent as remains is frequently chiefly composed of fine silica which is relatively free of trace elements.

Earth samples treated in accordance with the foregoing procedure ordinarily provide a final sample consisting of from 40 to 100 percent illite, depending upon the illite content of the original rock and the degree of interlaying. The majority of rocks provide final samples containing more than 60 percent illite. Although rocks initially containing less than 10 percent illite are not generally suitable for purification unless they are largely siliceous, this is not a serious limitation in view of the great abundance of illite in almost all marine sedimentary rocks.

In the case of rocks containing readily acid-soluble materials such as the carbonates of limestones, it is frequently preferable to dissolve the bulk sample in an acid, such as dilute hydrochloric acid of about 15 percent strength, for example, prior to the step of sonic disaggregation. This greatly reduces the time required for the effective disaggregation of the sample and the freeing of the clay-mineral particles from the other minerals.

Since illite is distinguished chemically from the other common clay minerals chiefly by its content of potassium, the percentage of illite in the final solid sample recovered from the alkali-acid treatments and final washing step may conveniently be determined by spectrographic analysis for potassium. This can, of course, be done in any of several ways. A preferred method is to excite the fluorescence of the potassium in the final sample by irradiation with X-rays of appropriate energy. For example, X-rays of 50,000 volts or more energy will excite the $K\alpha$ and other characteristic radiations of the potassium ion. The fluorescence thus excited by X-rays is analyzed by a crystal-grating spectrograph, and the amount of potassium is estimated from the size of the $K\alpha$ radiation peak for a standard X-ray intensity.

This is done preferably by scanning through the fluorescence spectrum with a counter-type detector while continuously recording the counting rate on a strip-chart recorder. Comparison of the peaks produced by the unknown and by a standard illite of known 85 percent purity gives the purity of the unknown. It is estimated that the measurement of the illite content of the final sample can be made in this way with a probable error of between 5 and 10 percent. An advantage of the X-ray fluorescence measurement, of course, is that the sample is not destroyed or adversely affected by the X-rays but remains available for further analysis or other uses.

This final measurement of the illite content of the purified sample can, of course, be omitted in those geochemical measurement procedures where the quantity of illite in the sample is not required and only the ratio of trace-element isotopes or of the trace elements to each other in the illite is needed.

While the invention has been described in terms of the foregoing specific details and examples, it is to be understood that further details and methods of use of the separation procedure, as well as modifications of certain steps thereof, will be apparent to those skilled in the art. The invention, therefore, should not be considered as limited to the details described, but its scope is to be ascertained from the appended claims.

I claim:

1. A method of separating clay-mineral illite from an earth sample in which it occurs with other minerals, said sample having been disaggregated into its constituent mineral grains without substantial alteration of the natural grain sizes, and the less than 2 micron particle-size fraction of said disaggregated sample having been separated from the remainder thereof by suspending said fraction in a quantity of liquid from which said remainder settles out, which method comprises boiling said less than 2 micron particle-size fraction for about four hours in about 6 N sodium hydroxide solution to dissolve a major portion of the clay minerals other than illite, contacting the insoluble residue of the sodium hydroxide treatment with hydrochloric acid for a period of time sufficient to convert into water-soluble salts the clay minerals attacked by said alkali, washing the insoluble residues of said acid-contacting step in water to dissolve substantially all water-soluble constituents, and recovering from said water a final insoluble residue comprising essentially illite suitable for geochemical analysis.

2. A method of separating the clay-mineral illite from an earth sample in which said illite occurs with other clay minerals, comprising passing high frequency sound waves through a container in which said sample is immersed in water to cause disaggregation of the particles, allowing settling to occur for a period of at least about 16 hours until substantially only fine particles of less than about 2 microns effective diameter remain suspended in the water column, drawing off said water column and recovering the clay particles therefrom, boiling said clay particles for about four hours in about 6 N sodium hydroxide solution to dissolve a major portion of the clay minerals other than illite, contacting the insoluble residue of the sodium hydroxide treatment with hydrochloric acid for a period of time sufficient to convert into water-soluble salts the clay minerals attacked by said alkali, washing the insoluble residues of said acid-contacting step in water to dissolve substantially all water-soluble constituents, and recovering from said water a final insoluble residue comprising essentially illite suitable for geochemical analysis.

References Cited in the file of this patent

UNITED STATES PATENTS

| | | |
|---|---|---|
| 1,916,902 | Wilbur | July 4, 1933 |
| 2,584,148 | Mills | Feb. 5, 1952 |